United States Patent [19]

Sugiyama et al.

[11] 3,833,124
[45] Sept. 3, 1974

[54] IMMERSION TYPE STRAINER
[75] Inventors: Masaaki Sugiyama, Fuji; Akira Mizusawa, Fujisawa, both of Japan
[73] Assignees: Nifco Inc., Tokyo; Yamakawa Industry Company Ltd., Fuji-shi, both of, Japan
[22] Filed: Oct. 3, 1973
[21] Appl. No.: 403,146

[30] Foreign Application Priority Data
Oct. 4, 1972  Japan............................... 47-114534

[52] U.S. Cl. ................................................ 210/460
[51] Int. Cl............................................... B01d 29/00
[58] Field of Search..................... 210/449, 460–463

[56] References Cited
UNITED STATES PATENTS
1,706,160  3/1929  Hinman ............................. 210/460
2,424,211  7/1947  Webb............................. 210/460 X
2,810,482  10/1957  Kasten .............................. 210/460

Primary Examiner—Samih N. Zaharna
Assistant Examiner—Richard W. Burks
Attorney, Agent, or Firm—J. R. Halvorsen; Robert W. Beart

[57] ABSTRACT

Disclosed is an improved immersion type strainer which is suitable particularly for use in a fuel tank of an automobile. The unique design of the pipe and associated female piece assures a loose-free connection between the pipe and the filter housing even if the strainer is subjected to continuous vibration or recurrent impacts.

5 Claims, 3 Drawing Figures

PATENTED SEP 3 1974   3,833,124

IMMERSION TYPE STRAINER

BACKGROUND OF THE INVENTION

This invention relates to an immersion type strainer, and more particularly to a strainer which is immersed in the fuel tank of an automobile, the chemical tank of a sprinkler or other liquid tank, and is used to purify the liquid before it is supplied from the tank.

Hitherto, in fixing a supply pipe to a strainer which is immersed in the fuel tank of an automobile, one end of the supply pipe has been inserted into an opening of the strainer housing and soldered to the circumference of the opening. Otherwise, one end of the supply pipe has been inserted into an opening of the strainer having a diameter somewhat smaller than the diameter of the pipe end which is thus tightly held thereby.

However, in soldering the pipe end to the strainer, the strainer is apt to be overheated around the opening to which the pipe end is being soldered, and not infrequently the strainer is marred in appearance. What is worse, the soldering is the cause for rusting. The soldering operation requires skill, and it is time-consuming work. Even if the pipe end is inserted and tightly held in the opening of the strainer, it is a high probability that the pipe will slip out from the opening of the strainer when the strainer is subjected to vibration from an automobil and other impacts.

The object of this invention is to overcome the defects mentioned above, that is, to allow an unskilled worker to easily fix the pipe end to the strainer housing in a vibration-proof fashion.

SUMMARY OF INVENTION

To attain this object, an immersion type strainer according to this invention comprises a filter housing, a pipe having a bulge portion and a female piece in the shape of a generally hollow cylinder, said female piece having a recess portion on the inner surface of the cylinder, said recess portion being of such a form as is complementary to said bulge portion, an annular collar portion around the outer surface of the cylinder and a raised portion in the vicinity of one end of the cylinder, thus allowing the annular collar portion and the raised portion of said female piece to clampingly grip the thickness of the top plate of said filter housing when said female piece is fitted in an opening of the top plate.

Other advantages and objects of this invention will be understood from the following explanation which is made with reference to the accompanying drawings.

BRIEF DESCRIPTION OF DRAWINGS

Referring to FIG. 1, a strainer according to this invention is shown immersed in the fuel tank of an automobile.

DETAILED DESCRIPTION OF INVENTION 1 is a fuel tank of an automobile, 2 is a filter gauze, and 5 a female piece. One end of the pipe (broken line) is fitted in a female piece 5 of the top plate 4 of the strainer housing. This female piece 5 is made of a plastic material, and is fixed to an opening 6 of the top plate 4. As shown in FIG. 2, the female piece 5 comprises a hollow cylinder having a radially extending collar portion 5a provided on the middle of the cylinder. The lower half of the hollow cylinder constitutes an insert 5b which projects into the interior of the strainer housing 2. The insert 5 has opposite tapered parts 7a and 7b, together constituting a ridge portion 7 around the insert of the female piece.

Figure 1:
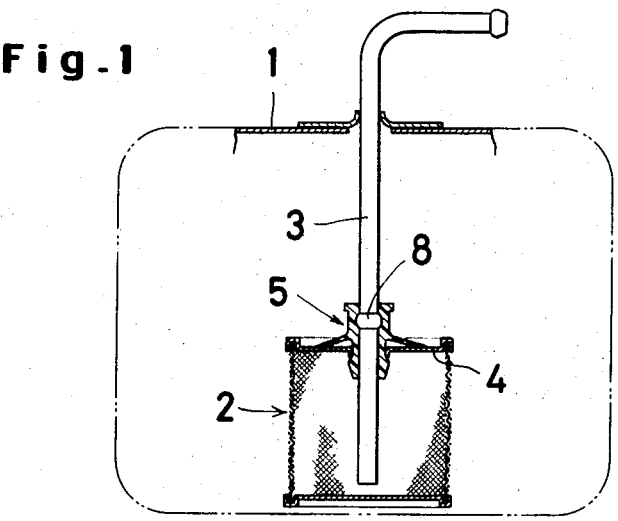
FIG. 1 is a sectional view of a strainer according to this invention immersed in a liquid tank.

The inner surface of the hollow cylinder of the female piece has an annular recess 9 which accommodates a bulge portion 8 of the fuel pipe 3.

The female piece 5 is pushed into the opening 6 of the top plate of the strainer housing until the ridge portion of the insert is snugly fitted in and engaged with the annular projection of the opening 6, and at the same time the collar portion 5a of the female piece is put into close contact with the top plate 4 of the strainer housing. Thus, the collar and ridge portions of the female piece together grip the top plate of the strainer housing, thus assuring a positive and fast mounting.

Figure 3:
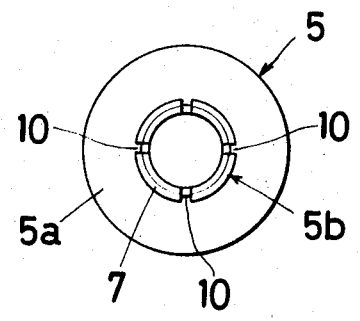
FIG. 3 is an end view of a female piece.

As shown in FIG. 3, the insert of the female piece has a plurality of longitudinal slits 10, which causes the insert diameter to yieldingly reduce when the female piece is inserted into the opening of the top plate, thus allowing the raised portion 7 of the insert to pass through the opening without resistance.

Figure 2:
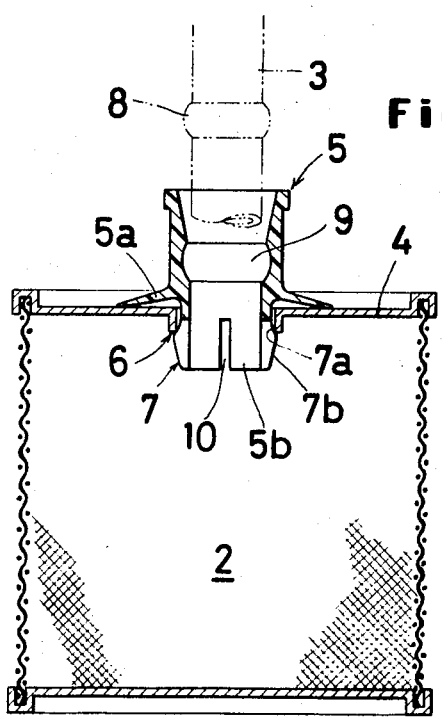
FIG. 2 is a cross-section of a strainer according to this invention.

One end of the fuel pipe is inserted into the female piece thus fitted in the opening of the top plate. More specifically, the fuel pipe is inserted into the female piece until the annular bulge portion 9 of the fuel pipe is snugly fitted in the recess portion of the female piece. As shown in FIG. 2, the opening at the upper end of the female piece is flared to serve as a guide for leading the end of the fuel pipe directly to the center of the female aperture even if it is put somewhat in misalignment with respect to the central axis of the female piece, and at the same time facilitating the insertion of the bulge portion of the fuel pipe. With the arrangement as specified above, the female piece can be easily fixed to the top plate, and the fuel pipe can be easily fitted in the female piece. Once the female piece and fuel pipe have been integrally fixed to the top plate of the strainer housing, they will not loosen even if the assembly is subjected to continuous vibration or recurrent impacts. Because the ridge 7 of the female piece 5 engages with the circumference of the opening 6 of the top plate, whereas the bulge portion of the pipe is snugly fitted in the inner recess of the female piece, thus preventing them from slipping off from the opening of the top plate. The structure of the female piece permits the manufacture thereof by plastic moulding, and therefore substantially identical female pieces can be produced. This is advantageous to mass production with high accuracy and consistent quality.

As mentioned above, the female piece is positively fixed to the top plate of the strainer housing by allowing the collar and ridge portions of the female piece to clampingly grip the thickness of the top plate therebetween, and at the same time by insertion of a fuel pipe of somewhat large diameter into the female piece and radially extending the same so that the edge of resulting in the invasion the opening of the top plate bites into the circumference of the female piece. This assures the firm and positive mounting of the female piece to the top plate of the strainer housing, irrespective of whether or not the opening size and or thickness of the top plate exactly corresponds to given standard size.

The annular collar of the female piece when fixed to the top plate, will cover the co-extensive annular area around the female shank, thus preventing dusts or impurities from invading into the interior of the strainer through the annular gap which would be found if the opening of the top plate is somewhat larger than the female piece. When the fuel pipe is fitted in the female piece, the bulge portion 8 of the fuel pipe is snugly fitted in the inner recess portion of the female piece, thus completely preventing the invasion into the strainer by dust or impurities which accumulate in the annular space formed between the fuel pipe and the flared end of the female piece.

Although this invention is described above with reference to the preferred embodiment, it should be understood that this invention is not limited to this particular embodiment, but can be modified without departing from the spirit of this invention, as for instance, by providing a hook-shaped projection on the lower part of the female piece in place of the opposite tapered ridge.

We claim:

1. An immersion type strainer comprising, a filter housing having a top plate with an opening therein, a pipe having a bulge portion and a female piece in the shape of a generally hollow cylinder, said female piece having a recess portion on the inner surface of the cylinder, said recess portion being of such a form as is complementary to said bulge portion, an annular collar portion around the outer surface of the cylinder and a raised portion in the vicinity of one end of the cylinder, the annular collar portion and the raised portion of said female piece being constructed and arranged to clampingly grip the top plate of said filter housing when said female piece is fitted in the opening of the top plate.

2. An immersion type strainer according to claim 1 wherein the other end of said female piece is of a divergent form in section.

3. An immersion type strainer according to claim 1 wherein said raised portion is composed of opposite tapered surfaces.

4. An immersion type strainer according to claim 1 wherein said raised portion is of a hook shape in section.

5. An immersion type strainer according to claim 1 wherein said one end of the cylinder has a plurality of longitudinal slits.

* * * * *